(12) United States Patent
Lyuh et al.

(10) Patent No.: US 11,847,465 B2
(45) Date of Patent: Dec. 19, 2023

(54) PARALLEL PROCESSOR, ADDRESS GENERATOR OF PARALLEL PROCESSOR, AND ELECTRONIC DEVICE INCLUDING PARALLEL PROCESSOR

(71) Applicant: ELECTRONICS AND TELECOMMUNICATIONS RESEARCH INSTITUTE, Daejeon (KR)

(72) Inventors: Chun-Gi Lyuh, Daejeon (KR); Hyun Mi Kim, Daejeon (KR); Young-Su Kwon, Daejeon (KR); Jin Ho Han, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/533,788

(22) Filed: Nov. 23, 2021

(65) Prior Publication Data

US 2022/0164192 A1 May 26, 2022

(30) Foreign Application Priority Data

Nov. 26, 2020 (KR) .......................... 10-2020-0161685
Mar. 17, 2021 (KR) .......................... 10-2021-0034787

(51) Int. Cl.
*G06F 9/38* (2018.01)
*G06F 9/355* (2018.01)
*G06F 12/02* (2006.01)

(52) U.S. Cl.
CPC .............. *G06F 9/3895* (2013.01); *G06F 9/355* (2013.01); *G06F 12/0207* (2013.01)

(58) Field of Classification Search
CPC .......... G06N 3/063; G06N 3/04; G06N 3/045; G06N 3/08; G06N 3/084; G06F 18/24143; G06F 17/153; G06V 10/454; G06V 10/82; G06V 10/96; G06V 30/194
See application file for complete search history.

(56) References Cited

U.S. PATENT DOCUMENTS

| 5,471,627 | A  | * | 11/1995 | Means | G06N 3/063 |
|  |  |  |  |  | 706/42 |
| 11,561,833 | B1 | * | 1/2023 | Heaton | G06F 9/544 |
| 2002/0080880 | A1 |  | 6/2002 | Park et al. |  |
| 2014/0307794 | A1 |  | 10/2014 | Park et al. |  |
| 2019/0042538 | A1 | * | 2/2019 | Koren | G06N 3/063 |
| 2021/0232897 | A1 | * | 7/2021 | Bichler | G06N 3/049 |

FOREIGN PATENT DOCUMENTS

| KR | 10-2019-0063393 A | 6/2019 |
| KR | 10-2019-0063437 A | 6/2019 |

* cited by examiner

*Primary Examiner* — Yaima Rigol (57) ABSTRACT

Disclosed is a parallel processor. The parallel processor includes a processing element array including a plurality of processing elements arranged in rows and columns, a row memory group including row memories corresponding to rows of the processing elements, a column memory group including column memories corresponding to columns of the processing elements, and a controller to generate a first address and a second address, to send the first address to the row memory group, and to send the second address to the column memory group. The controller supports convolution operations having mutually different forms, by changing a scheme of generating the first address.

13 Claims, 5 Drawing Sheets

```
for (INDEX_L_I = 0; INDEX_L_I < I_COUNT; INDEX_L_I++)
  for (INDEX_L_J = 0; INDEX_L_J < J_COUNT; INDEX_L_J++)
    for (INDEX_L_K = 0; INDEX_L_K < K_COUNT; INDEX_L_K++)
      for (INDEX_L_L = 0; INDEX_L_L < L_COUNT; INDEX_L_L++)
        for (INDEX_L_M = 0; INDEX_L_M < M_COUNT; INDEX_L_M++)
          ADDR_L = START_L +
                   INDEX_L_I * I_OFFSET +
                   INDEX_L_J * J_OFFSET +
                   INDEX_L_K * K_OFFSET +
                   INDEX_L_L * L_OFFSET +
                   INDEX_L_M * M_OFFSET;
```

PARALLEL PROCESSOR, ADDRESS GENERATOR OF PARALLEL PROCESSOR, AND ELECTRONIC DEVICE INCLUDING PARALLEL PROCESSOR

CROSS-REFERENCE TO RELATED APPLICATIONS

This application claims priority under 35 U.S.C. § 119 to Korean Patent Applications No. 10-2020-0161685 filed on Nov. 26, 2020, and 10-2021-0034787 filed on Mar. 17, 2021, in the Korean Intellectual Property Office, the disclosures of which are incorporated by reference herein in their entireties.

BACKGROUND

Embodiments of the present disclosure described herein relate to an electronic device, and more particularly, to a parallel processor having improved flexibility, an address generator of the parallel processor, and an electronic device including the parallel processor.

Studies and researches have been conducted to apply machine learning in various fields. The machine learning may include various algorithms, such as neural networks, decision trees, and support vector machines (SVMs).

Among neural network algorithms, a convolutional neural network algorithm has been extensively studied. The convolutional neural network algorithm shows strengths in inference of images. Accordingly, the convolutional neural network may be applied in various fields using image data.

A convolution operation of the convolutional neural network requires simple and iterative operations for an input tensor and a kernel tensor. To accelerate the convolution operation, researches and studies have been carried out regarding new processors more appropriate to the simple and iterative operations.

SUMMARY

Embodiments of the present disclosure provide a parallel processor having improved flexibility, an address generator of the parallel processor, and an electronic device including the parallel processor.

According to an embodiment, a parallel processor includes a processing element array including a plurality of processing elements arranged in rows and columns, a row memory group including row memories corresponding to rows of the processing elements, a column memory group including column memories corresponding to columns of the processing elements, and a controller to generate a first address and a second address, to send the first address to the row memory group, and to send the second address to the column memory group. The controller supports convolution operations having mutually different forms, by changing a scheme of generating the first address.

According to the embodiment, the address generator includes a first index generator to receive a plurality of first address generation parameters, to select one first address generation parameter of the plurality of first address generation parameters, and to output a first index based on the one first address generation parameter, and an address generation controller to control the first index generator to select the one first address generation parameter of the plurality of first address generation parameters.

According to the embodiment, each of the first address generation parameters includes a first start address, a first count, and a first offset.

According to the embodiment, the first index generator generates the first index by adding the first offset until the first count comes from the first start address of the one first address generation parameter.

According to the embodiment, the address generator further includes a second index generator to receive a plurality of second address generation parameters, to select one second address generation parameter of the plurality of second address generation parameters, and to output a second index based on the one second address generation parameter. The controller controls the second index generator to select the one second address generation parameter of the plurality of second address generation parameters.

According to the embodiment, each of the second address generation parameters includes a second start address, a second count, and a second offset.

According to an embodiment, when the first index of the first index generator reaches the first count of the one first address generation parameter, the second index generator generates the second index by adding the second offset to the second start address of the second address generation parameter.

According to an embodiment, the first index generator generates the first index by adding the first offset to the first count from the first start address of the one first address generation parameter, in response to updating the second index.

The controller controls the first index generator to select another first address generation parameter of the first address generation parameters, in response to that the second index of the second index generator reaches the second count of the second address generation parameter.

According to the embodiment, in response to that the first index generator selects the another first address generation parameter, the first index generator outputs, as the first index, the first start address of the another first address generation parameter, and the second index generator outputs, as the second index, the second start address of the one second address generation parameter.

According to an embodiment, the address generator further includes an address calculator to generate the first address by combining the first index and the second index.

According to an embodiment of the present disclosure, an address generator of a parallel processor includes a first index generator to receive a plurality of first address generation parameters, to select one first address generation parameter of the plurality of first address generation parameters, and to generate a first index based on the one first address generation parameter, a second index generator to receive a plurality of second address generation parameters, to select one second address generation parameter of the plurality of second address generation parameters, and to generate a second index based on the one second address generation parameter, a third index generator to receive a plurality of third address generation parameters, to select one third address generation parameter of the plurality of third address generation parameters, and to generate a third index based on the one third address generation parameter, and an address calculator to generate an address by combining the first index, the second index, and the third index.

According to an embodiment, each of the plurality of first address generation parameters, the plurality of second address generation parameters, and the plurality of third address generation parameters includes a start address, a count, and an offset.

According to an embodiment, the first index generator performs a first loop to generate the first index until the count comes while increasing the offset from the start address of the one first address generation parameter, the second index generator performs a second loop to generate the second index until the count comes while increasing the offset from the start address of the one second address generation parameter, and the third index generator performs a third loop to generate the third index until the count comes while increasing the offset from the start address of the one third address generation parameter.

According to an embodiment, the first loop is performed with respect to each of second indexes generated through the second loop, and the second loop is performed with respect to each of third indexes generated through the third loop.

According to an embodiment, when the third loop is completely performed, the first index generator selects another first address generation parameter of the plurality of first address generation parameters, and then the third loop is performed.

According to an embodiment, when the third loop is completely performed with respect to each of the plurality of first address generation parameters, the second index generator selects another second address generation parameter of the plurality of second address generation parameters, and then the third loop is performed.

According to an embodiment, when the third loop is completely performed with respect to each of the plurality of second address generation parameters, the third index generator selects another third address generation parameter of the plurality of third address generation parameters, and then the third loop is performed.

According to an embodiment of the present disclosure, an electronic device includes a main processor to execute an operating system, and a neural processor to perform a convolution operation depending on a request of the main processor. The neural processor includes a processing element array including a plurality of processing elements arranged in rows and columns, a row memory group including row memories corresponding to rows of processing elements, a column memory group including column memories corresponding to columns of processing elements, and a controller to generate a first address and a second address, to send the first address to the row memory group, and to send the second address to the column memory group. The controller supports different types of convolution operations by changing a scheme of generating the first address.

According to an embodiment, the neural processor is based on a systolic array.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described apparently and in detail to an extent that those skilled in the art is able to easily reproduce the embodiments.

Figure 1:
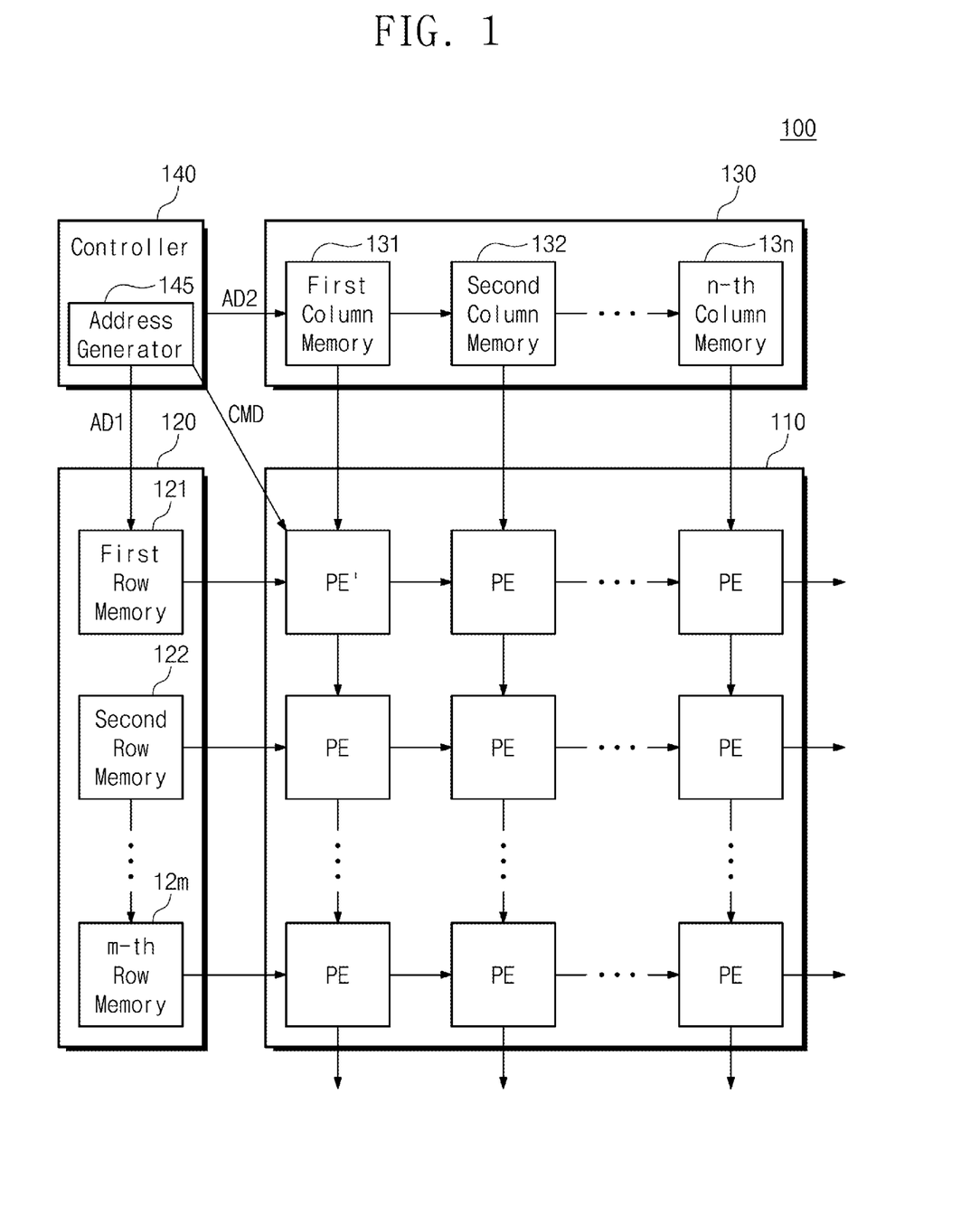
FIG. 1 illustrates a parallel processor based on a systolic array according to an embodiment of the present disclosure.

FIG. 1 illustrates a parallel processor 100 based on a systolic array according to an embodiment of the present disclosure. Referring to FIG. 1, the parallel processor 100 based on the systolic array includes a processing element array 110, a row memory group 120, a column memory group 130, and a controller 140.

The processing element array 110 may include processing elements PE and PE' arranged in rows and columns. The upper-left most processing element PE' may receive a command CMD from the controller 140, may receive first data from the row memory group 120, and receive second data from the column memory group 130. The processing element PE' may perform operations on the first data and the second data in response to the command CMD.

The processing element PE' may send at least one of the command CMD, the first data, the second data, and/or an operation result to a processing element PE located at the right of processing element PE'. The processing element PE' may transmit at least one of the command CMD, the first data, the second data, and/or the operation result to a processing element PE located at a lower side of the processing element PE'.

Each of the processing elements PE may receive the first data from a left processing element PE, which is located at a left side of the processing element PE, or the row memory group 120. Each of the processing elements PE may receive the command CMD from the left processing element PE or an upper processing element PE which is located at an upper side of the processing element PE. Each of the processing elements PE may receive the second data from an upper processing element PE, or the column memory group 130. Each of the processing elements PE may receive the operation result (e.g., a previous operation result) from a left processing element PE or an upper processing element PE.

Each of the processing elements PE may perform an operation with respect to the first data, the second data, and/or the previous operation result(s), in response to the command CMD to generate an operation result. Each of the processing elements PE may send at least one of the command CMD, the first data, the second data, the previous operation result(s), and/or the operation result to a right processing element PE, which is located at the right side of the processing element PE, or a lower processing element PE which is located at the lower side of the processing element PE.

For example, an additional memory may be added at the right side of the processing element array 110 and/or the lower side of the processing element array 110 to receive operations results and/or previous operation results of the processing elements PE and PE'. Some or all of the row memory group 120, the column memory group 130, and/or the additional memory may be mechanically implemented in the form of one memory and may be implemented in the form of storage spaces which are logically partitioned.

For another example, the processing elements PE and PE' may be implemented to output the operation result and/or the previous operation result(s) to the left side and/or the upper side of the processing elements PE and PE'. A transfer path may be added between the processing elements PE and PE' to send the operation result and/or the previous operation result(s) to the left side or the upper side of the processing elements PE and PE'. The row memory group 120 and/or the column memory group 130 may be implemented to store the operation results and/or the previous operation results of the processing elements PE and PE', which are received from processing element array 110. The row memory group 120 and the column memory group 130 may be mechanically implemented in the form of one memory and may be implemented in the form of storage spaces which are logically partitioned.

The row memory group 120 may include first to m-th row memories 121 to 12m corresponding to rows of the processing elements PE, respectively. The first row memory 121 may receive a first address AD1 from the controller 140. Each of the first to m-th row memories 121 to 12m may send the first address AD1 to a lower row memory, which is located at a lower side of each row memory, in response to receiving the first address AD1. The first to m-th row memories 121 to 12m may send the first data, which corresponds to the first address AD1, to the processing elements PE and PE' located at the right side of the row memories, in response to receiving the first address AD1.

The column memory group 130 may include first to n-th column memories 131 to 13n corresponding to columns of the processing elements PE, respectively. The first column memory 131 may receive a second address AD2 from the controller 140. Each of the first to n-th column memories 131 to 13n may send the second address AD2 to a right row memory, which is located at a right side of each row memory, in response to receiving the second address AD2. The first to n-th column memories 131 to 13n may send the second data, which corresponds to the second address AD2, to the processing elements PE and PE' located at the lower side of the column memories, in response to receiving the second address AD2.

The controller 140 may generate the command CMD for the processing elements PE and PE', the first address AD1 for the row memory group 120, and the second address AD2 for the column memory group 130 every clock cycle. In response to that the controller 140 sends the command CMD (e.g., an operation command) to the processing element PE', each of the processing elements PE and PE' may send the command CMD to the lower side and the right side simultaneously. Accordingly, the command CMD may be sent to all processing elements PE at the final stage.

The controller 140 may include an address generator 145. The address generator 145 may generate the first address AD1 and the second address AD2 necessary for the operations of the processing elements PE and PE'.

Figure 2:
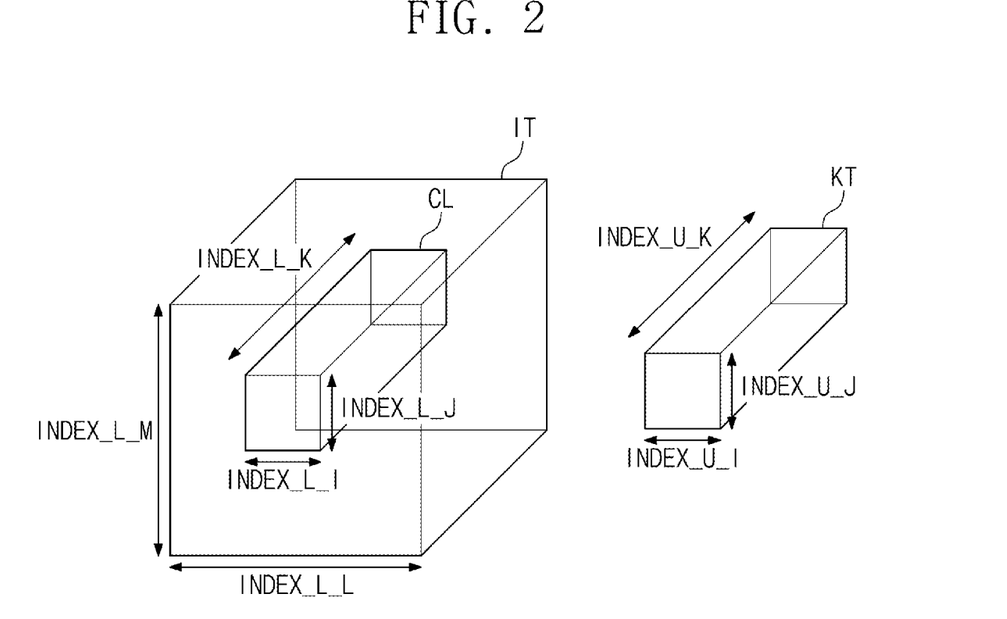
FIG. 2 illustrates a convolution operation computed by the parallel processor.

FIG. 2 illustrates a convolution operation computed by the parallel processor 100. Referring to FIGS. 1 and 2, the convolution operation may include a process of applying a kernel tensor KT to, for example, a specific location CL of locations of an input tensor IT. For example, the input tensor IT may be input as the row memory group 120, and the kernel tensor KT may be input as the column memory group 130.

Indexes INDEX_L_M, INDEX_L_L, INDEX_L_I, INDEX_L_J, INDEX_L_K, INDEX_U_I, INDEX_U_J, and INDEX_U_K illustrated in FIG. 2 are parameters used to generate the first address AD1 and the second address AD2 to perform the convolution operation by the parallel processor 100.

Figure 3:
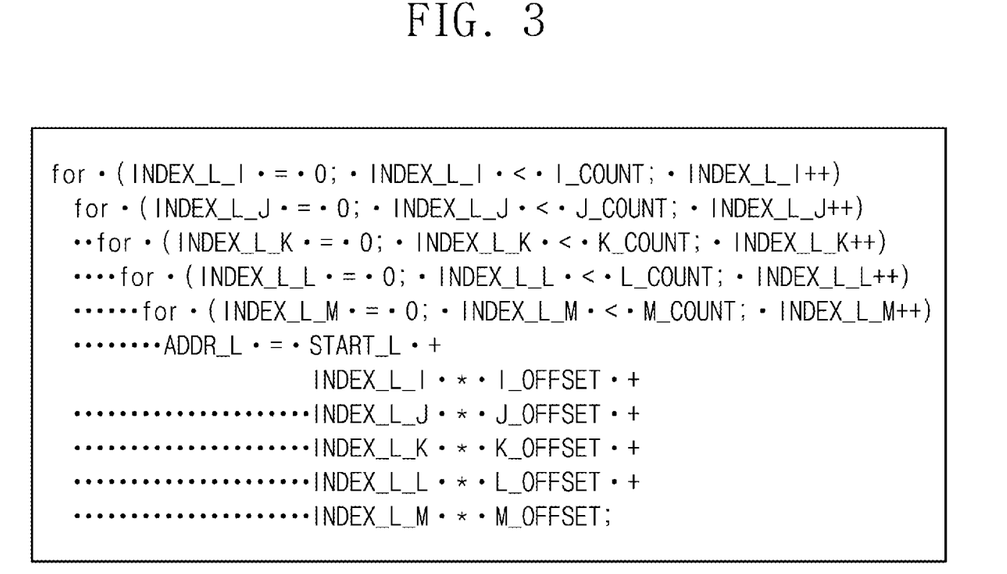
FIG. 3 illustrates a nested loop implemented by an address generator.

According to a first embodiment, to perform the convolution operation by the parallel processor 100, the address generator 145 may implement a nested loop in hardware (or software). FIG. 3 illustrates a nested loop implemented by the address generator 145. The nesting degree may be variously modified or changed depending on a hardware configuration.

For example, the indexes INDEX_L_I, INDEX_L_J, and INDEX_L_K of the specific location CL of the input tensor IT associated with the first address AD1 may be used to generate the first address AD1 corresponding to the size of the kernel tensor KT to apply the kernel tensor KT to the specific location CL in the input tensor IT. The indexes INDEX_U_I, INDEX_U_J, and INDEX_U_K of the kernel tensor KT associated with the second address AD2 may be used to generate the second address AD2 corresponding to the size of the kernel tensor KT.

Counts L_COUNT and M_COUNT of the input tensor IT may correspond to the size of the input tensor IT. Counts I_COUNT, J_COUNT, and K_COUNT of the specific location CL may correspond to the size of the kernel tensor KT. Offsets I_OFFSET, J_OFFSET, K_OFFSET, L_OFFSET, and M_OFFSET may correspond to the stride of the convolution operation The address generator 145 may be implemented to generate the first address AD1 and the second address AD2 based on software. However, when the address generator 145 is implemented and accelerated based on hardware, the parallel processor 100 may be implemented to perform an operation every cycle (e.g., clock cycle).

When the address generator 145 is implemented based on hardware, the address generator 145 may include a register having a start address START_L in which counts I_COUNT, J_COUNT, K_COUNT, L_COUNT, and M_COUNT, offsets I_OFFSET, J_OFFSET, K_OFFSET, L_OFFSET, and M_OFFSET, and the input tensor IT are stored.

Figure 4:
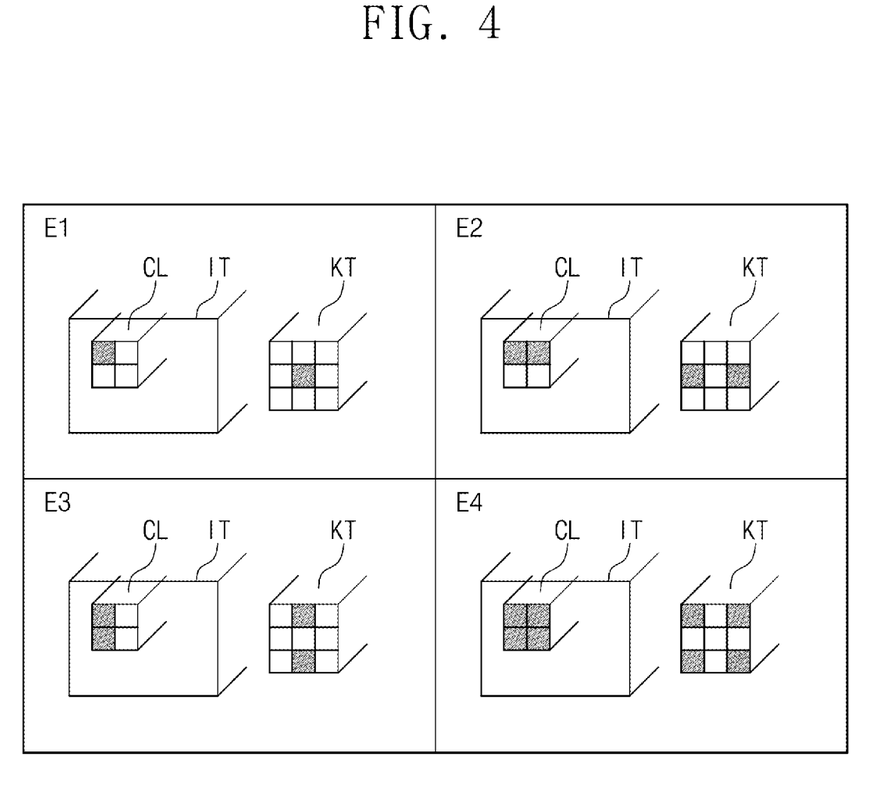
FIG. 4 illustrates examples based on an input tensor and a kernel tensor necessary for the operation of a convolution transpose.

FIG. 4 illustrates examples based on the input tensor IT and the kernel tensor KT necessary for the operation of the convolution transpose. Referring to FIGS. 1 and 4, as illustrated in a first example E1, a second example E2, a third example E3, and a fourth example E4 of FIG. 4, four-type reference forms may be necessary in the specific location CL of the input tensor IT. In addition, four-type reference forms may be necessary even for the kernel tensor KT.

An operation requiring a plurality of reference forms like the operation of the convolution transpose may not be performed in the hardware based on a nested loop, which is illustrated in FIG. 3.

Figure 5:
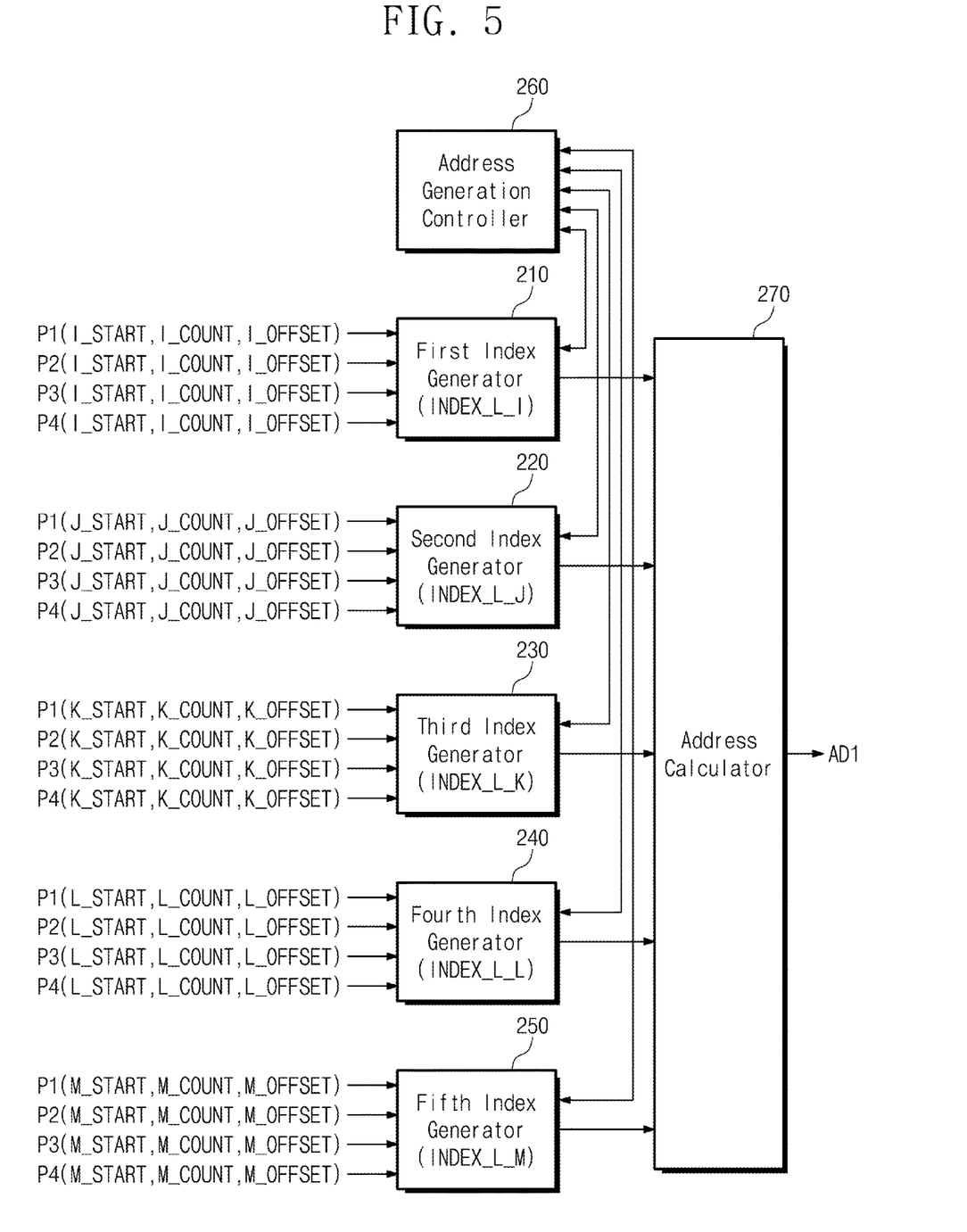
FIG. 5 illustrates an address generator according to an embodiment of the present disclosure.

FIG. 5 illustrates an address generator 200 according to an embodiment of the present disclosure. Referring to FIGS. 1 and 5, the address generator 200 may correspond to the address generator 145 of FIG. 1. The address generator 200 may include a first index generator 210, a second index generator 220, a third index generator 230, a fourth index generator 240, a fifth index generator 250, an address generation controller 260, and an address calculator 270.

Each of the first index generator 210, the second index generator 220, the third index generator 230, the fourth index generator 240, and the fifth index generator 250 may correspond to a nested loop. That is, the address generator 200 may include five nested loops.

Each of the first index generator 210, the second index generator 220, the third index generator 230, the fourth index generator 240, and the fifth index generator 250 may receive a plurality of address generation parameters. For example, each of the first index generator 210, the second index generator 220, the third index generator 230, the fourth index generator 240 and the fifth index generator 250 may receive four address generation parameters P1 to P4.

For example, the first index generator 210 may receive first to fourth address generation parameters P1 to P4. Each of the first to fourth address generation parameters P1 to P4 may include a start address I_START, a count I_COUNT, and an offset I_OFFSET. Start addresses I_START, counts I_COUNT, and/or offsets I_OFFSET of the first to fourth address generation parameters P1 to P4 may be the same as or different from each other.

For example, the second index generator 220 may receive first to fourth address generation parameters P1 to P4. Each of the first to fourth address generation parameters P1 to P4 may include a start address J START, a count J_COUNT, and an offset J_OFFSET. Start addresses J START, counts J_COUNT, and/or offsets J_OFFSET of the first to fourth address generation parameters P1 to P4 may be the same as or different from each other.

For example, the third index generator 230 may receive the first to fourth address generation parameters P1 to P4. Each of the first to fourth address generation parameters P1 to P4 may include a start address K_START, a count K_COUNT, and an offset K_OFFSET. The start addresses K_START, counts K_COUNT, and/or offsets K_OFFSET of the first to fourth address generation parameters P1 to P4 may be the same as or different from each other.

For example, the fourth index generator 240 may receive the first to fourth address generation parameters P1 to P4. Each of the first to fourth address generation parameters P1 to P4 may include a start address L START, a count L_COUNT, and an offset L_OFFSET. Start addresses L START, counts L_COUNT, and/or offsets L_OFFSET of the first to fourth address generation parameters P1 to P4 may be the same as or different from each other.

For example, the fifth index generator 250 may receive first to fourth address generation parameters P1 to P4. Each of the first to fourth address generation parameters P1 to P4 may include a start address M START, a count M_COUNT, and an offset M_OFFSET. Start addresses M START, counts M_COUNT, and/or offsets M_OFFSET of the first to fourth address generation parameters P1 to P4 may be the same as or different from each other.

Each of the first index generator 210, the second index generator 220, the third index generator 230, the fourth index generator 240, and the fifth index generator 250 may select one of the first to fourth address generation parameters P1 to P4 in response to the control of the address generation controller 260. The first index generator 210, the second index generator 220, the third index generator 230, the fourth index generator 240, and the fifth index generator 250 may generate indexes INDEX_L_I, INDEX_L_J, INDEX_L_K, INDEX_L_L, or INDEX_L_M, respectively based on the selected parameter.

For example, each of the first index generator 210, the second index generator 220, the third index generator 230, the fourth index generator 240, and the fifth index generator 250 may generate an index by adding an offset to a start address in the first clock cycle. Each of the first index generator 210, the second index generator 220, the third index generator 230, the fourth index generator 240, and the fifth index generator 250 may output a new index by adding an offset to a previous index, every clock cycle from the second clock cycle, until the index reaches a count.

The address calculator 270 may generate the first address AD1 by combining (for example, adding) the indexes INDEX_L_I, INDEX_L_J, INDEX_L_K, INDEX_L_L, and INDEX_L_M output from the first index generator 210, the second index generator 220, the third index generator 230, the fourth index generator 240, and the fifth index generator 250 every clock cycle.

The address generation controller 260 may receive information on the indexes INDEX_L_I, INDEX_L_J, INDEX_L_K, INDEX_L_L, and INDEX_L_M, and may control the first index generator 210, the second index generator 220, the third index generator 230, the fourth index generator 240, and the fifth index generator 250 to select address generation parameters, based on the received information.

For example, as illustrated in the first to fourth examples E1 to E4 of FIG. 4, when the convolution transpose operation is performed, the address generation controller 260 may perform a control operation such that the indexes INDEX_L_I, INDEX_L_J, and INDEX_L_K are generated through four schemes different from each other. The address generation controller 260 may control the first index generator 210, the second index generator 220, the third index generator 230, the fourth index generator 240, and the fifth index generator 250 to select the first address generation parameter P1.

Thereafter, the address generation controller 260 may control the first index generator 210, the second index generator 220, the third index generator 230, the fourth index generator 240, and the fifth index generator 250 to perform loops for generating the indexes INDEX_L_I, INDEX_L_J, INDEX_L_K, INDEX_L_L, and INDEX_L_M.

Thereafter, the address generation controller 260 may control the first index generator 210, the second index generator 220, and the third index generator 230 to select the second address generation parameter P2. Then, the address generation controller 260 may control the first index generator 210, the second index generator 220, the third index generator 230, the fourth index generator 240, and the fifth index generator 250 to perform loops for generating the indexes INDEX_L_I, INDEX_L_J, INDEX_L_K, INDEX_L_L, and INDEX_L_M.

Thereafter, the address generation controller 260 may control the first index generator 210, the second index generator 220, and the third index generator 230 to select the third address generation parameter P3. Then, the address generation controller 260 may control the first index generator 210, the second index generator 220, the third index generator 230, the fourth index generator 240, and the fifth index generator 250 to perform loops for generating the indexes INDEX_L_I, INDEX_L_J, INDEX_L_K, INDEX_L_L, and INDEX_L_M.

Thereafter, the address generation controller 260 may control the first index generator 210, the second index generator 220, and the third index generator 230 to select the fourth address generation parameter P4. Then, the address generation controller 260 may control the first index generator 210, the second index generator 220, the third index generator 230, the fourth index generator 240, and the fifth index generator 250 to perform loops for generating the indexes INDEX_L_I, INDEX_L_J, INDEX_L_K, INDEX_L_L, and INDEX_L_M.

According to an embodiment of the present disclosure, the address generator 200 may perform a convolution operation through mutually different schemes by alternately selecting the address generation parameters P1 to P4. Accordingly, the parallel processor 100, which is able to perform various parallel operations, may be provided.

Figure 6:
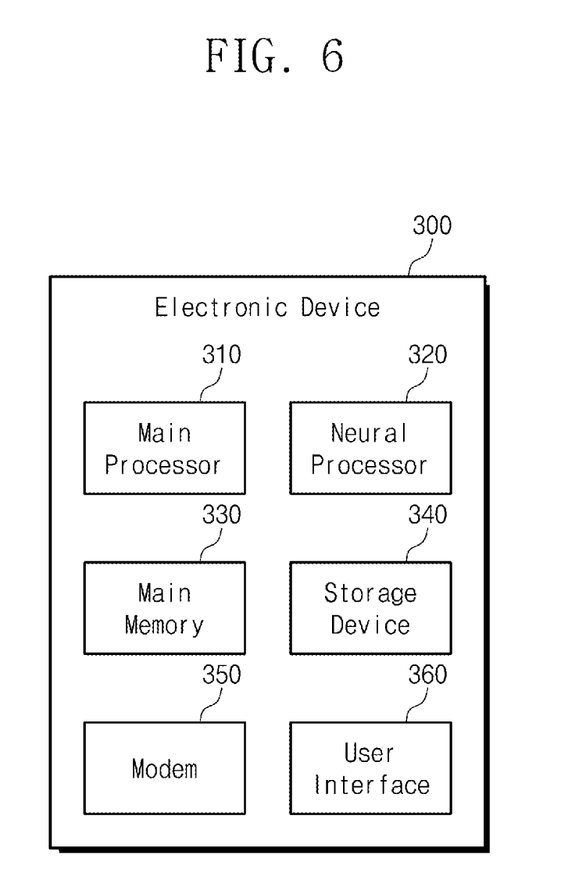
FIG. 6 illustrates an electronic device according to an embodiment of the present disclosure.

FIG. 6 illustrates an electronic device 300 according to an embodiment of the present disclosure. Referring to FIG. 6, the electronic device 300 may include a main processor 310, a neural processor 320, a main memory 330, a storage device 340, a modem 350, and a user interface 360.

The main processor 310 may include a central processing unit or an application processor. The main processor 310 may execute an operating system and applications using the main memory 330. The neural processor 320 may perform a convolution operation in response to a request from the main processor 310. The neural processor 320 may include the parallel processor 100 described with reference to FIGS. 1 to 5.

The main memory 330 may be an operating memory of the electronic device 300. The main memory 330 may include a random access memory. The storage device 340 may store original data of the operating system and the applications executed by the main processor 310, and may store data generated by the main processor 310. The storage device 340 may include a nonvolatile memory.

The modem 350 may perform wireless or wired communication with an external device. The user interface 360 may include a user input interface to receive information from a user, and a user output interface to output information to the user.

In the above embodiments, components according to the technical spirit of the present disclosure have been described by using the terms "a first~", "a second~", and "a third~". However, the terms "a first~", "a second~", and "a third~" are used to distinguish among the components, and the present disclosure is not limited thereto. For example, the terms "a first~", "a second~", and "a third~" do not indicate the sequence or a predetermined numeric meaning.

In the above-described embodiments, components according to embodiments of the present disclosure have been referred to using blocks. The blocks include various hardware devices such as Integrated Circuit (IC), Application Specific IC (ASIC), Field Programmable Gate Array (FPGA), Complex Programmable Logic Device (CPLD), etc., software such as firmware running on the hardware devices or applications, or the combined form of hardware devices and software. In addition, the blocks may include circuits including semiconductor devices in the IC and circuits registered as intellectual properties (IP).

According to the present disclosure, the address generator of the parallel processor may be configured to generate an address through mutually different schemes. Accordingly, there are provided a parallel processor capable of supporting convolution operations performed through mutually different manners and improved flexibility, an address generator of the parallel processor, and an electronic device including the parallel processor.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A parallel processor comprising:
a processing element array including a plurality of processing elements arranged in rows and columns;
a row memory group including row memories corresponding to rows of the processing elements;
a column memory group including column memories corresponding to columns of the processing elements; and
a controller configured to generate a first address and a second address, to send the first address to the row memory group, and to send the second address to the column memory group,
wherein the controller is configured to support a plurality of convolution operations having different types, by changing a scheme of generating the first address.

2. The parallel processor of claim 1, wherein an address generator includes:
a first index generator to receive a plurality of first address generation parameters, to select one first address generation parameter of the plurality of first address generation parameters, and to output a first index based on the one first address generation parameter; and
an address generation controller configured to control the first index generator to select the one first address generation parameter of the plurality of first address generation parameters.

3. The parallel processor of claim 2, wherein each of the first address generation parameters includes a first start address, a first count, and a first offset.

4. The parallel processor of claim 3, wherein the first index generator generates the first index by adding the first offset, until the first count comes from the first start address of the one first address generation parameter.

5. The parallel processor of claim 4, wherein the address generator further includes:
a second index generator to receive a plurality of second address generation parameters, to select one second address generation parameter of the plurality of second address generation parameters, and to output a second index based on the one second address generation parameter, and
wherein the controller is configured to:
control the second index generator to select the one second address generation parameter of the plurality of second address generation parameters.

6. The parallel processor of claim 5, wherein each of the second address generation parameters includes:
a second start address, a second count, and a second offset.

7. The parallel processor of claim 6, wherein the second index generator generates the second index by adding the second offset to the second start address of the second address generation parameter, when the first index of the first index generator reaches the first count of the one first address generation parameter.

8. The parallel processor of claim 7, wherein the first index generator generates the first index by adding the first offset to the first count from the first start address of the one first address generation parameter, in response to updating the second index.

9. The parallel processor of claim 7, wherein the controller is configured to:

control the first index generator to select another first address generation parameter of the first address generation parameters, in response to that the second index of the second index generator reaches the second count of the second address generation parameter.

10. The parallel processor of claim 9, wherein the first index generator outputs, as the first index, the first start address of the another first address generation parameter, and the second index generator outputs, as the second index, the second start address of the one second address generation parameter, in response to that the first index generator selects the another first address generation parameter.

11. The parallel processor of claim 5, wherein the address generator further includes:
an address calculator to generate the first address by combining the first index and the second index.

12. An electronic device comprising:
a main processor configured to execute an operating system; and
a neural processor configured to perform a convolution operation depending on a request of the main processor,
wherein the neural processor includes:
a processing element array including a plurality of processing elements arranged in rows and columns;
a row memory group including row memories corresponding to rows of processing elements;
a column memory group including column memories corresponding to columns of processing elements; and
a controller configured to generate a first address and a second address, to send the first address to the row memory group, and to send the second address to the column memory group,
wherein the controller is configured to support different types of convolution operations by changing a scheme of generating the first address.

13. The electronic device of claim 12, wherein the neural processor is based on a systolic array.

* * * * *